I. Jewett,
Cutlery Scourer.
Nº 67,434.   Patented Aug. 6, 1867.
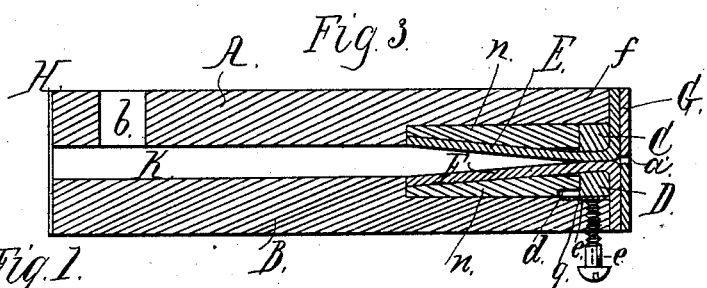
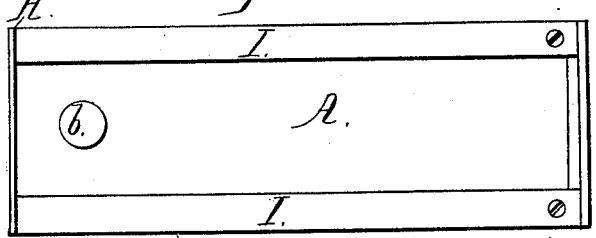
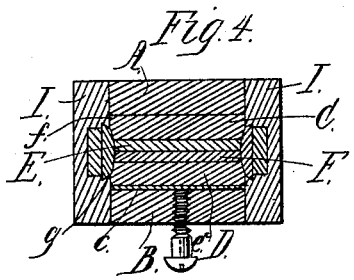
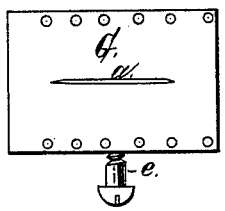
Witnesses;
Geo. H. Andrews
Lauritz Möller
Inventor,
Insley Jewett.
by his attorney.
R. H. Eddy

United States Patent Office.

INSLEY JEWETT, OF BOSTON, ASSIGNOR TO HIMSELF AND JOHN P. JEWETT, OF HYDE PARK, MASSACHUSETTS.

Letters Patent No. 67,434, dated August 6, 1867.

IMPROVED KNIFE-CLEANER.

The Schedule referred to in these Letters Patent and making part of the same.

TO ALL PERSONS TO WHOM THESE PRESENTS MAY COME:

Be it known that I, INSLEY JEWETT, of Boston, in the county of Suffolk, and State of Massachusetts, have invented an improved Machine for Cleaning Knives or various other articles of cutlery; and I do hereby declare the same to be fully described in the following specification, and represented in the accompanying drawings, of which—

Figure 1 is a top view.
Figure 2, a front end view.
Figure 3, a longitudinal section, and
Figure 4, a transverse section of it.

The main part of the machine is a long box, whose top and bottom A B are formed at their ends with recesses $f$ and $g$ to receive two long pieces or prisms, C D, of India rubber. In rear of these recesses both portions A B are sloped back in manner as shown at $h\ h$. The parts so sloped, as well as the pieces of rubber C D, are covered with strips of leather, as shown at E F; such strips being bent around against and so as to cover the front ends of the parts A B, in manner as shown in the drawings. The pieces of leather E F are to be secured in place by means of nails driven through them into the parts A B. The elastic strip or prism D rests on a metallic plate, $c$, over which is a recess, $d$, to enable the said plate to be raised up against the piece D of India rubber by means of screws $e$ arranged in the bottom B, in manner as represented. A mouth-piece, G, of leather, provided with a long slot, $a$, is arranged against the turned parts of the pieces of leather E F, in manner as shown in fig. 3, such mouth-piece being fastened in place by nails or screws going through it, and into the parts A B and side plates I I applied thereto. A plate, H, of leather or other suitable material, is fastened to and upon the rear ends of the pieces A B I I, so as to form therewith a chamber or space, K, for receiving emery or other suitable polishing or cleaning powder, which may be introduced into the space through a hole made in the piece A, such hole being provided with a plug, $b$.

In using the knife-cleaning apparatus thus made, the knife-blade is to be inserted in the notch or slot $a$, and pushed forward and drawn backward several times between the strips of leather E F, and into the mass of emery in the chamber K. The springs C D will keep the leathers in close contact with the knife-blade.

I claim the combination and arrangement of the strips of leather E F, the pieces of India rubber C, and the compression-screw $e$, or its equivalent, with the emery-receptacle, formed of the plates A B I I, as described.

I also claim the combination of the slotted mouth-piece G with the strips E F, the pieces of rubber C D, and the plates A B I I, arranged as specified.

INSLEY JEWETT.

Witnesses:
R. H. EDDY,
SAMUEL N. PIPER.